United States Patent
Ao et al.

(10) Patent No.: US 7,942,068 B2
(45) Date of Patent: May 17, 2011

(54) METHOD AND SYSTEM FOR MULTI-PATH ULTRASONIC FLOW RATE MEASUREMENT

(75) Inventors: Xiaolei Shirley Ao, Lexington, MA (US); Robert Caravana, Lexington, MA (US); Edward Randall Furlong, Beverly, MA (US); Oleg Alexander Khrakovsky, Lynn, MA (US); Benjamin Edward McDonald, Holliston, MA (US); Nicholas Joseph Mollo, Wilmington, MA (US); Lydia Shen, Acton, MA (US)

(73) Assignee: GE Infrastructure Sensing, Inc., Billerica, MA (US)

( * ) Notice: Subject to any disclaimer, the term of this patent is extended or adjusted under 35 U.S.C. 154(b) by 135 days.

(21) Appl. No.: 12/402,325

(22) Filed: Mar. 11, 2009

(65) Prior Publication Data

US 2010/0229654 A1    Sep. 16, 2010

(51) Int. Cl.
*G01F 1/66* (2006.01)
*G06F 19/00* (2006.01)

(52) U.S. Cl. ........... 73/861.31; 702/79

(58) Field of Classification Search ............ None
See application file for complete search history.

(56) References Cited

U.S. PATENT DOCUMENTS

| | | | |
|---|---|---|---|
| 3,555,899 A | 1/1971 | Yamamoto et al. | |
| 3,564,912 A | 2/1971 | Malone et al. | |
| 3,940,985 A | 3/1976 | Wyler | |
| 4,078,428 A | 3/1978 | Baker et al. | |
| 4,102,186 A | 7/1978 | Brown | |
| 4,103,551 A | 8/1978 | Lynnworth | |
| 4,300,401 A | 11/1981 | Pedersen | |
| 4,336,719 A * | 6/1982 | Lynnworth | 73/861.27 |
| 4,432,243 A | 2/1984 | Lowell et al. | |
| 4,596,133 A | 6/1986 | Smalling et al. | |

(Continued)

FOREIGN PATENT DOCUMENTS

DE    19632165 A1    2/1998

(Continued)

OTHER PUBLICATIONS

Methodology for Developing a High-Precision Ultrasound Flow Meter and Fluid Velocity Profile Reconstruction; Emmanuelle Mandard et al., IEEE Transactions on Ultrasonics, Ferroelectrics, and Frequency Control, vol. 55, No. 1, Jan. 2008, pp. 161-172.

(Continued)

*Primary Examiner* — Harshad Patel
(74) *Attorney, Agent, or Firm* — Global Patent Operation; Mark A. Conklin

(57) ABSTRACT

In one embodiment, a multi-path ultrasonic flow meter for determining the flow rate of a fluid in a conduit is disclosed comprising at least two transducer pairs attached to the conduit at two chord locations, one greater than and one less than a mid-radius chord, wherein the composite ratio the two path velocities to the flow rate is substantially constant over the range of Reynolds numbers. In another embodiment, a method of determining the flow rate of a fluid in a conduit is disclosed comprising the steps of determining a composite velocity by determining a weighted average of a plurality of path velocities, determining a chord velocity ratio based on the path velocities, determining a profile correction factor based on the composite velocity and the chord velocity ratio, and determining the flow rate based on the composite velocity and the profile correction factor.

14 Claims, 5 Drawing Sheets

U.S. PATENT DOCUMENTS

| | | | |
|---|---|---|---|
| 4,646,575 | A | 3/1987 | O'Hair et al. |
| 4,754,650 | A | 7/1988 | Smalling et al. |
| 4,856,321 | A | 8/1989 | Smalling et al. |
| 5,546,812 | A | 8/1996 | Drenthen et al. |
| 5,546,813 | A | 8/1996 | Hastings et al. |
| 5,597,962 | A | 1/1997 | Hastings et al. |
| 5,639,972 | A | 6/1997 | Hastings et al. |
| 5,705,753 | A | 1/1998 | Hastings et al. |
| 5,987,997 | A | 11/1999 | Roskam et al. |
| 6,047,602 | A * | 4/2000 | Lynnworth ............. 73/632 |
| 6,089,104 | A | 7/2000 | Chang |
| 6,330,831 | B1 | 12/2001 | Lynnworth et al. |
| 6,626,049 | B1 | 9/2003 | Ao |
| 6,732,595 | B2 | 5/2004 | Lynnworth |
| 6,816,808 | B2 * | 11/2004 | Freund et al. ............. 702/178 |
| 6,950,768 | B2 * | 9/2005 | Freund et al. ............. 702/89 |
| 7,000,485 | B2 | 2/2006 | Ao et al. |
| 7,096,135 | B2 | 8/2006 | Ao et al. |
| 7,152,490 | B1 * | 12/2006 | Freund et al. ............. 73/861.27 |
| 7,290,455 | B2 * | 11/2007 | Groeschel ............. 73/861.28 |
| 7,299,120 | B2 | 11/2007 | Serebrennikov et al. |
| 2004/0123666 | A1 | 7/2004 | Ao et al. |
| 2007/0136008 | A1 | 6/2007 | Liu et al. |
| 2008/0134798 | A1 | 6/2008 | Li et al. |
| 2008/0156107 | A1 | 7/2008 | Ao et al. |
| 2009/0000392 | A1 | 1/2009 | Zhou et al. |
| 2009/0007625 | A1 | 1/2009 | Ao et al. |

FOREIGN PATENT DOCUMENTS

| | | |
|---|---|---|
| WO | WO-2005026666 | 3/2005 |

OTHER PUBLICATIONS

Computer Simulations of Ultrasonic Flow Meter Performance in Ideal and Non-Ideal Pipeflows; T.T. Yeh et al., Fluid Flow Group Process Measurements Division Chemical Science and Technology Laboratory National Institute of Standards and Technology Gaithersburg, Maryland, 1997 ASME Fluids Engineering Division Summer Metter FEDSM'97 Jun. 22-26, 1997.

The Daniel Seniorsonic Multipath Gas Flowmeter, Daniel SeniorSonic, Section 1.1 Product Overview.

EP10155720, European Search Report and Written Opinion, Jul. 19, 2010.

* cited by examiner

METHOD AND SYSTEM FOR MULTI-PATH ULTRASONIC FLOW RATE MEASUREMENT

BACKGROUND OF THE INVENTION

This invention relates generally to ultrasonic flow rate measurement, and more particularly to multi-path ultrasonic flow meter.

Ultrasonic flow meters are used to determine the flow rate (i.e., mean pipe flow rate ($V_m$)) of a variety of fluids (e.g., liquids, gases, etc.) and speed of sound in the fluid flowing in pipes of different sizes and shapes. Knowledge of the flow rate of the fluid can enable other physical properties or qualities of the fluid to be determined. For example, in some custody-transfer applications, the flow rate can be used to determine the volume (Q) of a fluid (e.g., oil or gas) being transferred from a seller to a buyer through a pipe to determine the costs for the transaction, where the volume is equal to the flow rate multiplied by the cross sectional area (A) of the pipe. In other applications, the speed of sound can be used to determine the mean molecular weight of a fluid flowing in a pipe to optimize and control chemical or combustion processes.

In one type of ultrasonic flow meter employing transit time flow metering, one or more pairs of ultrasonic transducers can be attached to a pipe (or spool piece attached to a pipeline), where each pair can contain transducers located upstream and downstream from each other forming an ultrasonic path between them. Each transducer, when energized, transmits an ultrasonic signal (e.g., a sound wave) along an ultrasonic path through the flowing fluid that is received by and detected by the other transducer. The path velocity (i.e., path or chord velocity ($V_p$)) of the fluid averaged along an ultrasonic path can be determined as a function of the differential between (i) the transit time of an ultrasonic signal traveling along the ultrasonic path from the downstream transducer upstream to the upstream transducer against the fluid flow direction, and (2) the transit time of an ultrasonic signal traveling along the ultrasonic path from the upstream transducer downstream to the downstream transducer with the fluid flow direction.

The path velocity ($V_p$) of the fluid averaged along one or more ultrasonic paths between the pairs of transducers does not necessarily represent the flow rate ($V_m$) of the fluid across the entire cross section of the pipe since path velocity has a radial distribution wherein the flow velocity across the pipe is not necessarily uniform (i.e., all of the fluid in the pipe does not flow at the same path velocity). This radial distribution of the flow velocity is described by its flow profile (or fluid velocity profile), which is a function of several factors, including the Reynolds number ($R_e$). The Reynolds number ($R_e$) is a dimensionless number that characterizes the behavior of fluids flowing through a pipe by providing a measure of the ratio of the inertial force (i.e., flow rate ($V_m$)) to the viscous force (i.e., kinematic viscosity (v)) of the fluid flowing in a closed circular pipe with a known diameter (D), and is equal to the product of the flow rate and the pipe diameter divided by the kinematic viscosity of the fluid ($R_e=(V_m*D)/v$). Knowledge of the Reynolds number allows for the determination of the profile of fluid flow in the pipe: (1) for a relatively low Reynolds number (e.g., $R_e<2300$), laminar profile (parabolic shape where the maximum path velocity is at the center of the pipe and the flow velocity gradually decreases to zero at the pipe wall); (2) for a relatively high Reynolds number (e.g., $R_e>4000$), turbulent profile (flattened shape where the flow velocity is virtually constant except for an area near the pipe wall); and (3) for an intermediate Reynolds number (e.g., $2300<R_e<4000$), transitional profile (combination of laminar and turbulent).

In addition to the Reynolds number, which is generally the principal factor affecting a flow profile and is dependent on the kinematic viscosity of the fluid, the flow profile is also a function of several other factors, including fluid characteristics, pipe roughness, pipe configuration (e.g., straight, bends, elbows, tees, valves, headers, etc.), and disturbances caused by the transducer ports. Accordingly, in order to determine the flow profile for a particular ultrasonic flow meter installation, a number of installation-specific pieces of information would be required, including knowledge of several of the physical properties of the fluid and the pipe, some of which may change over time (e.g., relative pipe wall roughness ($\epsilon/D$)).

Rather than determining a flow profile, prior art solutions using multiple paths ($P_i$) and multiple path velocities ($V_{pi}$), select the locations of the transducer pairs (i.e., the ultrasonic paths) and the weights ($w_i$) to be assigned to each path velocity ($V_{pi}$) in determining a mean flow rate ($V_m$) based on one or more known mathematical techniques (e.g., Gaussian Quadrature, Chebycheff, Lobatto, etc.) as described in, for example, U.S. Pat. Nos. 3,564,950 and 3,940,985.

While these prior art solutions minimize the need to determine some installation-specific pieces of information required to determine the flow profile, the solutions only provide moderate to high accuracy for a flow profile that requires a high order polynomial required to describe it (i.e., the higher the complexity of the flow profile, the higher the order of the polynomial) unless there are sufficient ultrasonic paths and transducers provided in the ultrasonic flow meter to improve the accuracy. For example, if a $15^{th}$ order polynomial is required to describe the flow profile, a total of eight ((15+1)/2) ultrasonic paths and transducer pairs can be required for improved accuracy, which would also increase the cost of the flow meter, increase the difficulty of installation of large number of transducers given the space constraints on a pipe, and increase the disturbances to the flow causes by the large number of transducer ports. Furthermore, since several ultrasonic flow meter applications require highly accurate flow rate ($V_m$) measurements (e.g., custody-transfer applications for liquid hydrocarbons often require an accuracy of 0.15%) that cannot always be achieved by simply increasing the number of ultrasonic paths and transducers in these prior art solutions, complicated calibration schemes using calibration factors that are based on several of the physical properties of the fluid and/or the pipe (e.g., the Reynolds number) are required anyway to achieve the required accuracy, which increases the costs and complexity of the flow meters.

It would be advantageous to provide an ultrasonic flow meter that can provide highly accurate flow rate measurements without the use of complicated flow meter design and calibration schemes.

BRIEF DESCRIPTION OF THE INVENTION

In one embodiment, a multi-path ultrasonic flow meter for determining the flow rate of a fluid in a conduit is disclosed comprising at least two transducer pairs attached to the conduit at two chord locations, one greater than and one less than a mid-radius chord, wherein the composite ratio the two path velocities to the flow rate is substantially constant over the range of Reynolds numbers.

In another embodiment, a method of determining the flow rate of a fluid in a conduit is disclosed comprising the steps of determining a composite velocity by determining a weighted average of a plurality of path velocities, determining a chord velocity ratio based on the path velocities, determining a profile correction factor based on the composite velocity and the chord velocity ratio, and determining the flow rate based on the composite velocity and the profile correction factor.

DETAILED DESCRIPTION OF THE INVENTION

Figure 1:
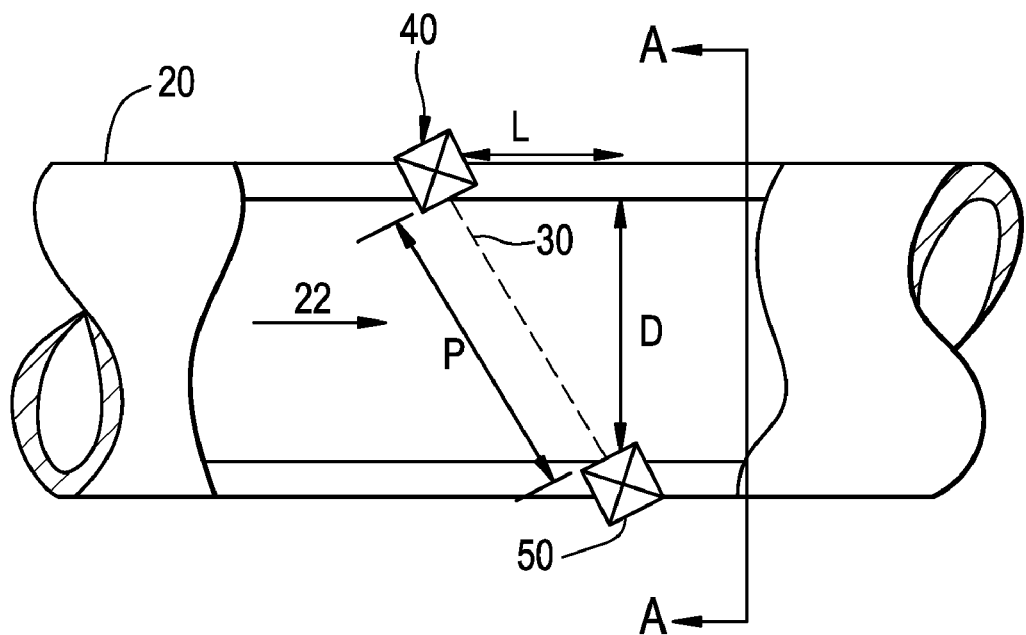
FIG. 1 is a cross-section of an ultrasonic flow meter cut along the diameter plane of the conduit in one embodiment of the invention.

FIG. 1 illustrates an ultrasonic flow meter 1 employing transit time flow metering to determine the flow rate of a fluid. Although FIG. 1 shows a single pair of transducers 40, 50 attached to a conduit 20 forming a single ultrasonic path 30, it will be understood by a person of ordinary skill in the art that two or more pairs of transducers 40, 50, each forming separate ultrasonic paths, can be used to form a multi-path ultrasonic flow meter. Based on the fluid flow direction 22, one transducer 40 can be installed upstream of the downstream transducer 50 on the conduit 20, which can be a section of the pipe or a separate spool piece hot-tapped to the pipeline. The ultrasonic path 30 can be on the center (i.e., diameter (D)) of the conduit 20 or on chordal paths (i.e., path not on the center of the conduit 20). Each transducer 40, 50, when energized, transmits an ultrasonic signal along the ultrasonic path 30 through the flowing fluid that is received by and detected by the other transducer 50, 40.

The path velocity ($V_p$) of the fluid averaged along an ultrasonic path 30 can be determined as a function of the differential between the upstream transit time ($t_{up}$) (i.e., the time of an ultrasonic signal traveling along the ultrasonic path 30 from the downstream transducer 50 upstream to the upstream transducer 40 against the fluid flow direction 22) and the downstream transit time ($t_{dn}$) (i.e., the time of an ultrasonic signal traveling along the ultrasonic path 30 from the upstream transducer 40 downstream to the downstream transducer 50 with the fluid flow direction 22) of the ultrasonic signals. In the presence of fluid flow, the downstream transit time ($t_{dn}$) is faster (or shorter) that the upstream transit time ($t_{up}$). Since the transit time differential ($\Delta t$) is proportional to the path velocity ($V_p$) of the fluid, the path velocity ($V_p$) of the fluid averaged along the ultrasonic path 30 can be determined as a function of the transit time differential ($\Delta t$) as well as other known parameters, such as the conduit 20 diameter (D), ultrasonic path length (P), and the angle ($\theta$) formed between the ultrasonic path 30 and the fluid flow direction 22 as shown in FIG. 1:

$$V_p = \frac{P}{2}\left(\frac{t_{up} - t_{dn}}{(t_{dn} \times t_{up})\cos\theta}\right) \quad (1)$$

$$\cos\theta = \frac{L}{P} \quad (2)$$

$$V_p = \frac{P^2}{2L}\left(\frac{t_{up} - t_{dn}}{t_{dn} \times t_{up}}\right) \quad (3)$$

Figure 2:
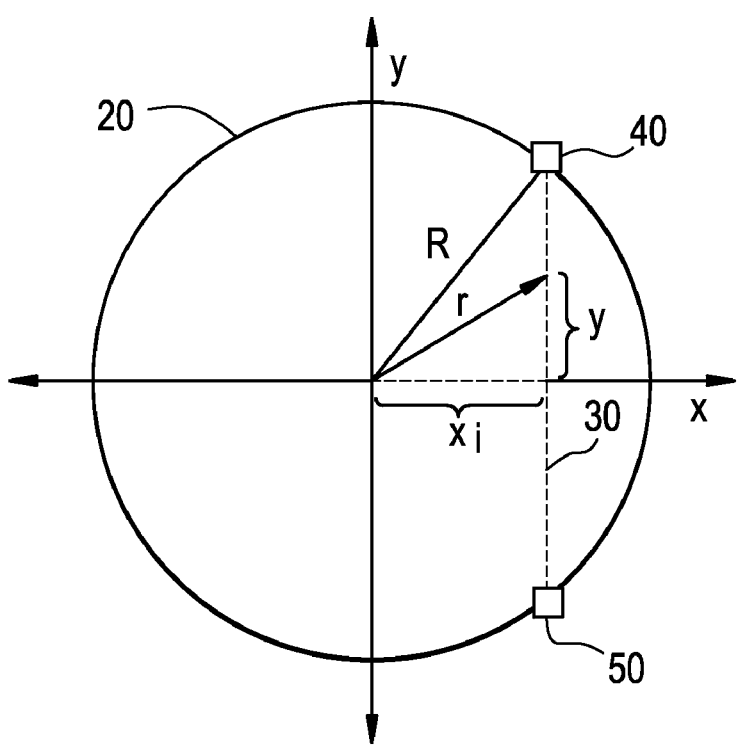
FIG. 2 shows the ultrasonic path of FIG. 1 viewed along section A-A of FIG. 1.

FIGS. 1 and 2 illustrate the ultrasonic flow meter 1 of FIG. 1 along the ultrasonic path 30, demonstrating the geometric relationship between the ultrasonic path 30 established by placing transducers 40, 50 at the $x_i$ chord location on the conduit 20. The path velocity ($V_{pi}$) averaged along a particular ultrasonic path 30 corresponding to $x_i$ chord location can be expressed by:

$$V_{pi} = \int_{y(min)}^{y(max)} V\text{point}(x_i, y) dl \quad (4)$$

where:
$V_{point}$ is the velocity at a particular point along the ultrasonic path 30;

$$y(min) = -\sqrt{R^2 - x_i^2}; \quad (5)$$

$$y(max) = \sqrt{R^2 - x_i^2}; \text{ and} \quad (6)$$

R=radius of the conduit (20)

Furthermore, it is known that the-path velocity ($V_{pi}$) averaged along a particular ultrasonic path 30 corresponding to $x_i$ chord location for a well-developed turbulent fluid flow (e.g., fluid flow through sufficiently long straight lengths of pipe with minimal disturbances before and after the ultrasonic flow meter 1) can be expressed by:

$$V_{pi} = \int_{-\sqrt{R^2-x_i^2}}^{\sqrt{R^2-x_i^2}} V_m \left[1 - \frac{0.715 + 1.0751 * \log\left(\frac{\sqrt{x_i^2+y^2}}{R}\right)}{\log\left(\frac{0.2703\varepsilon}{D} + \frac{5.74}{R_e^{0.9}}\right)}\right] dy \quad (7)$$

where:
$V_m$ is the flow rate (i.e., the mean flow rate);
$\varepsilon/D$ is the relative pipe wall roughness;
$R_e$ is the Reynolds number; and
R=radius of the conduit 20.

This equation can be rewritten as a ratio of the-path velocity ($V_{pi}$) averaged along a particular ultrasonic path 30 to the flow rate ($V_m$) for $x_i$ chord location as follows:

$$\frac{V_{pi}}{V_m} = \int_{-\sqrt{R^2-x_i^2}}^{\sqrt{R^2-x_i^2}} \left[1 - \frac{0.715 + 1.0751 * \log\left(\frac{\sqrt{x_i^2+y^2}}{R}\right)}{\log\left(\frac{0.2703\varepsilon}{D} + \frac{5.74}{R_e^{0.9}}\right)}\right] dy \quad (8)$$

Figure 3:
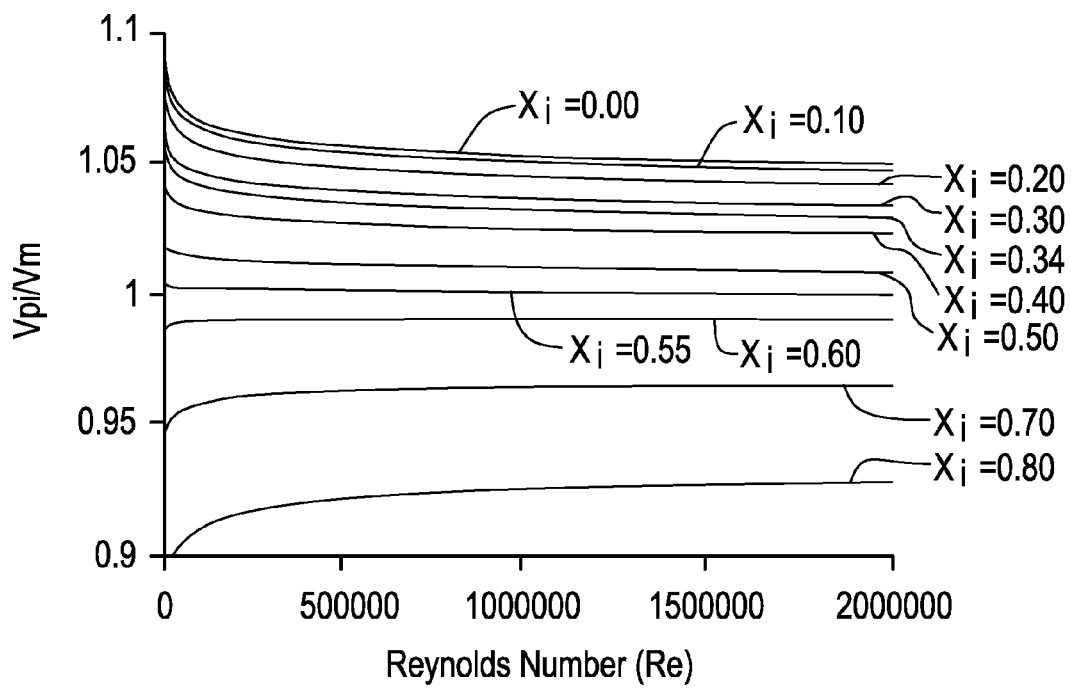
FIG. 3 is a graph showing the variance of the ratio ($V_{pi}/V_m$) over a range of Reynolds numbers ($R_e$) for various chord locations.

This equation can be used to determine the variance of the ratio of the path velocity ($V_{pi}$) to the flow rate ($V_m$) for various $x_i$ chord locations (i.e., location of a single pair of transducers 40, 50) over a range of Reynolds numbers ($R_e$). For example, assuming a nominal radius of 1 (R=1) and a relative pipe wall roughness of $10^{-5}(\varepsilon/D=10^{-5})$, FIG. 3 shows the variance of the ratio ($V_{pi}/V_m$) over a range of Reynolds numbers ($R_e$) from 2,000 to 2,000,000 for $x_i$ chord locations of 0.00, 0.10, 0.20, 0.30, 0.34, 0.40, 0.50, 0.55, 0.60, 0.70, and 0.80. The results shown in FIG. 3 demonstrate the at a chord location of $x_i=0.55$, the ratio ($V_{pi}/V_m$) is substantially constant over the range of Reynolds numbers ($R_e$), including all sub-ranges of Reynolds numbers ($R_e$) (e.g., 2,000 to 500,000). Accordingly, if a single pair of transducers 40, 50 were installed at chord location of $x_i=0.55$, knowledge of the Reynolds number ($R_e$) or kinematic viscosity (v) of the fluid would not necessarily be required to determine the flow rate ($V_m$) based on the path velocity ($V_{pi}$) averaged along the ultrasonic path 30 at that chord location. As used herein, the mid-radius chord ($x_{mr}$) is the chord location $x_i$ where the ratio ($V_{pi}/V_m$) is substantially constant over the range of Reynolds numbers ($R_e$). The use of a single pair of transducers 40, 50 and a single ultrasonic path 30 at the mid-radius chord $x_{mr}$ is not preferred as it does not offer redundancy in the event of failure of one or more transducers 40, 50.

The results shown in FIG. 3 can also be used to identify multiple chord locations $x_i$ that can be used in conjunction with each other where knowledge of the Reynolds number ($R_e$) or kinematic viscosity (v) of the fluid would not necessarily be required to determine the flow rate ($V_m$) based on the path velocity ($V_{pi}$) averaged along the ultrasonic paths 30 at those chord locations. For example, the results shown in FIG. 3 demonstrate that for chord locations $x_i$ greater than the mid-radius chord (e.g., $x_i > x_{mr}$), the ratio of the path velocity ($V_{pi}$) to the flow rate ($V_m$) increases as the Reynolds number ($R_e$) increases, while for chord locations less than the mid-radius chord ($x_i < x_{mr}$), the ratio of the path velocity ($V_{pi}$) to the flow rate ($V_m$) decreases as the Reynolds number ($R_e$) increases.

Figure 4:
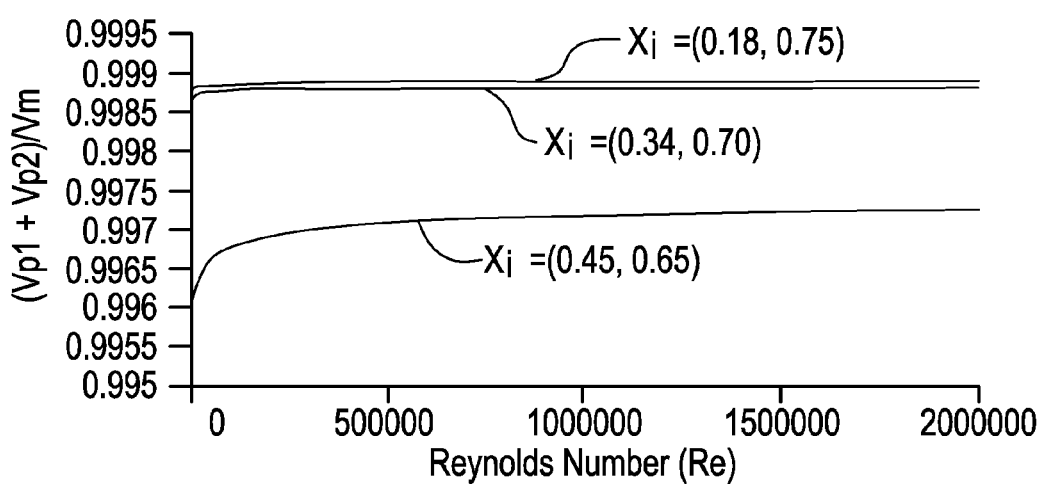
FIG. 4 is a graph showing the variance of the composite ratio (($V_{p1}+V_{p2})/V_m$) over a range of Reynolds numbers ($R_e$) for various pairs of chord locations.

Based on these relationships, the inventors have discovered that one or more chord locations $x_i$ greater than the mid-radius chord $x_{mr}$ can be used along with one or more chord locations $x_i$ below the mid-radius chord $x_{mr}$ to provide a composite ratio of the path velocity to the pipe flow rate for these multiple (n) paths (e.g., ($V_{p1}/V_m + V_{p2}/V_m + \ldots V_{pn}/V_m$) or ($V_{p1} + V_{p2} + V_{pn})/V_m$) that is substantially constant over the range of Reynolds numbers ($R_e$). Effectively, the effect of the Reynolds number ($R_e$) on the path velocities ($V_{pi}$) for the chord locations greater than the mid-radius chord $x_{mr}$ are cancelled by the effect of the Reynolds number ($R_e$) on the-path velocities ($V_{pi}$) for the chord locations less than the mid-radius chord $x_{mr}$. Accordingly, if pairs of transducers 40, 50 are installed at properly selected multiple chord locations $x_i$, knowledge of the Reynolds number ($R_e$) or kinematic viscosity (v) of the fluid would not necessarily be required to determine the flow rate ($V_m$) based on the path velocities ($V_{pi}$) averaged along the ultrasonic paths 30 at the chord locations. FIG. 4 shows the variance of the composite ratio (($V_{p1} + V_{p2})/V_m$) over a range of Reynolds numbers ($R_e$) from 2,000 to 2,000,000 for three exemplary pairs of chord locations ($x_1=0.75$ and $x_2=0.18$; $x_1=0.70$ and $x_2=0.34$; and $x_1=0.65$ and $x_2=0.45$). The results shown in FIG. 4 demonstrate that for each of these pairs of chord locations ($x_1$ and $x_2$), the composite ratio (($V_{p1} + V_{p2})/V_m$) is substantially constant over the range of Reynolds numbers ($R_e$).

A person of ordinary skill in the art would understand that several other combinations of chord locations, some greater than and some less than the mid-radius chord $x_{mr}$ can be selected beyond these examples to produce a composite ratio (($V_{p1} + V_{p2} + V_{pn})/V_m$) that is substantially constant over the range of Reynolds numbers ($R_e$). For example, while each of the exemplary pairs of chord locations shown in FIG. 4 include a single chord location less than the mid-radius chord $x_{mr}$ (e.g., $x_1=0.70$) and a single chord location greater than the mid-radius chord ($x_2=0.34$), other combinations could include multiple chord locations greater than and less than the mid-radius chord $x_{mr}$. Similarly, other combinations could include a different number of chord locations (e.g., two) greater than the mid-radius chord $x_{mr}$ than the number of chord locations (e.g., one) less than the mid-radius chord $x_{mr}$ as long as the composite ratio of the path velocity to the pipe flow rate for these multiple (n) paths is substantially constant over the range of Reynolds numbers ($R_e$).

Figure 5:
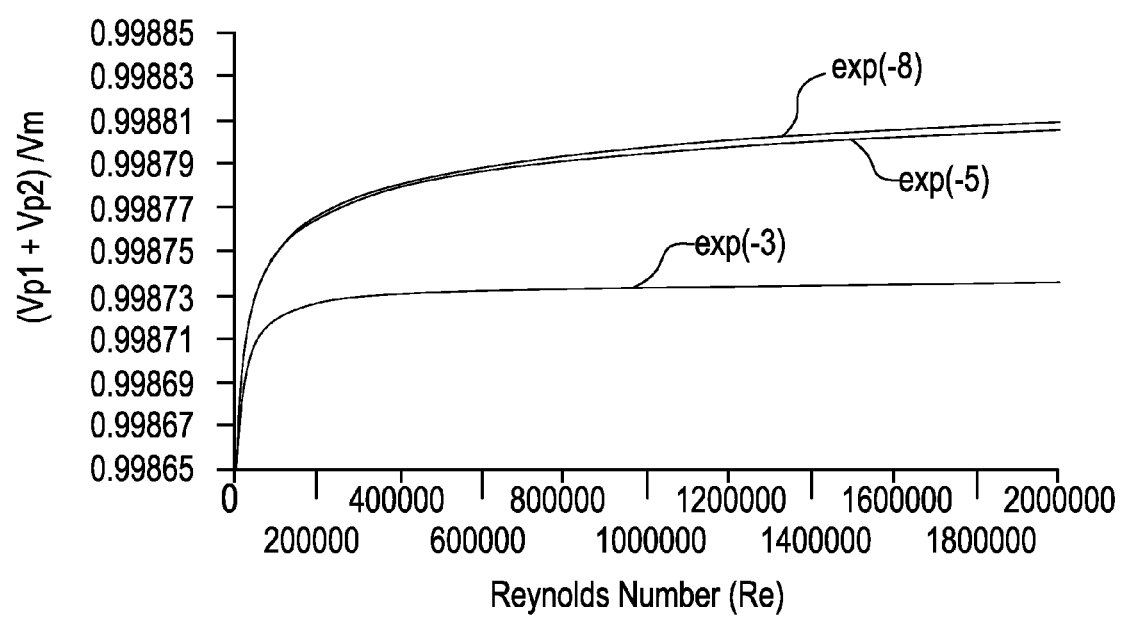
FIG. 5 is a graph showing the variance of the composite ratio (($V_{p1}+V_{p2})/V_m$) over a range of Reynolds numbers for an exemplary pair of chord locations for various relative pipe wall roughnesses.

The inventors have also discovered that the composite ratios (e.g., ($V_{p1} + V_{p2})/V_m$) are also substantially constant over the range of Reynolds numbers ($R_e$) even when the relative pipe wall roughness ($\epsilon$/D) changes over time. Based on equation (8), FIG. 5 shows the variance of the composite ratio (($V_{p1} + V_{p2})/V_m$) over a range of Reynolds numbers ($R_e$) from 2,000 to 2,000,000 for chord locations ($x_1=0.70$ and $x_2=0.34$) for three exemplary relative pipe wall roughness ($\epsilon$/D=$10^{-3}$, $10^{-5}$, and $10^{-8}$). FIG. 5 demonstrates that even if the relative pipe wall roughness ($\epsilon$/D) for a particular pipe were to significantly change (i.e., from $10^{-3}$ to $10^{-8}$) after calibration of an ultrasonic flow meter 1 using the exemplary chord locations, that change would not necessarily require additional calibration since the change would have a negligible impact on the accuracy of the ultrasonic flow meter 1.

Figure 6:
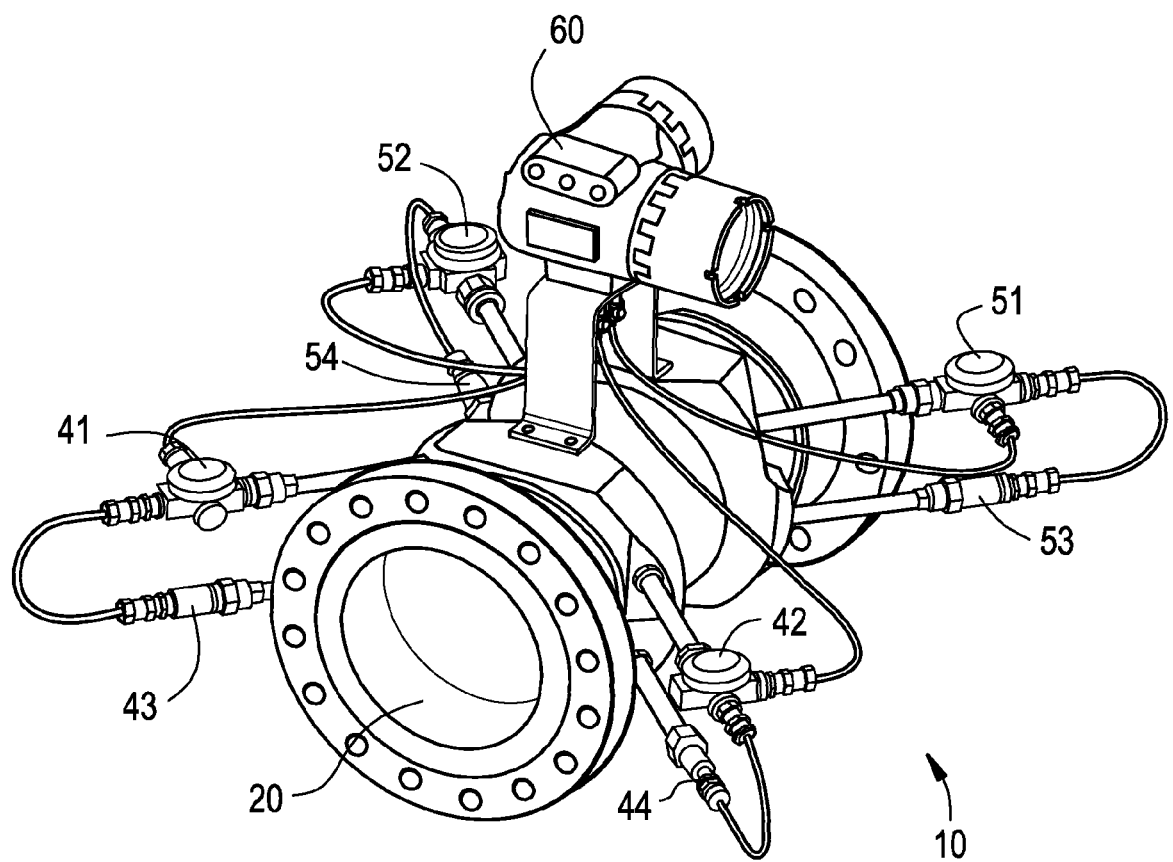
FIG. 6 is a perspective view of a multi-path ultrasonic flow meter in one embodiment of the invention.
Figure 7:
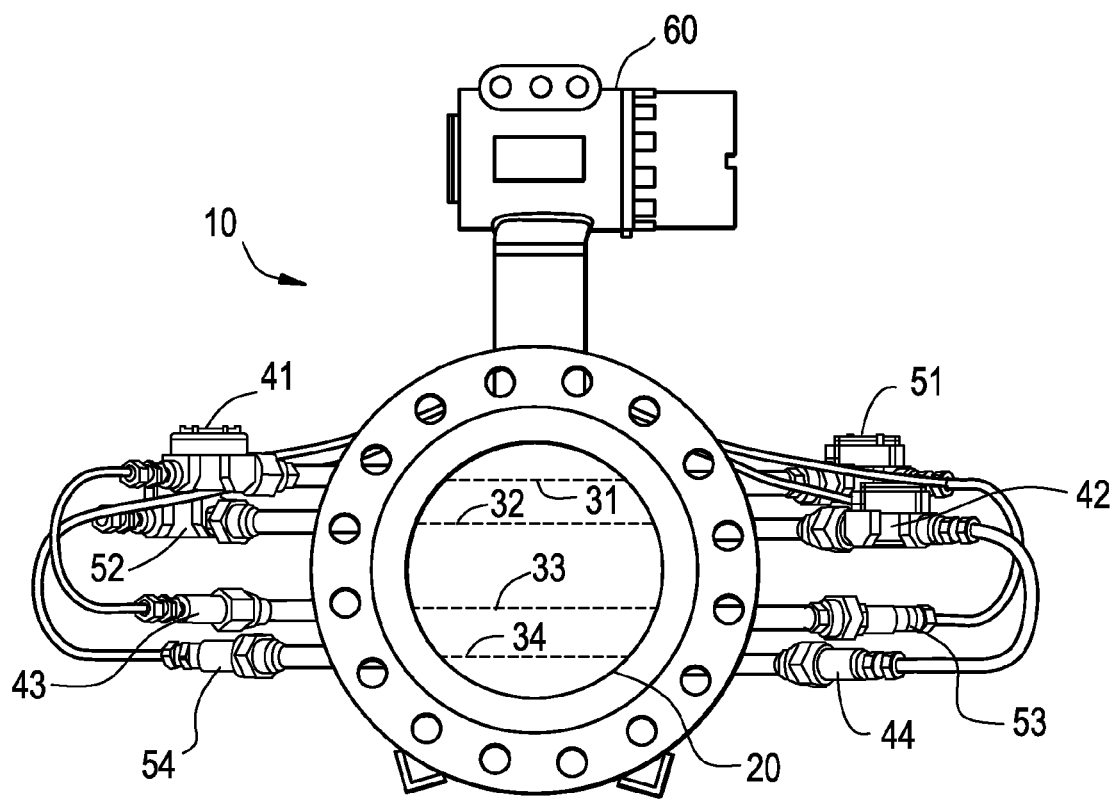
FIG. 7 is an end view of the multi-path ultrasonic flow meter in FIG. 6.

In one embodiment of a multi-path ultrasonic flow meter 10 shown in FIGS. 6 and 7, a total of four ultrasonic paths (n=4) (p1, p2, p3, and p4) 31, 32, 33, 34 are formed by four pairs of upstream transducers 41, 42, 43, 44 and downstream transducers 51, 52, 53, 54 at the following exemplary chord locations: $x_1=0.70$, $x_2=0.34$ $x_3=0.34$, $x_4=-0.70$) on the conduit 20, which is in the form of a spool piece. These chord locations $x_i$ are selected on both sides of the conduit (one side $0.00 < x_i < 1.00$ and the other side $0.00 < x_i < -1.00$) each side having a mid-radius chord (e.g., $x_{mr12}=0.55$ and $x_{mr34}=-0.55$), such that each side has at least one chord location $x_i$ greater than the mid-radius chord and at least one chord location less than the mid-radius chord. As discussed previously, each set of two pairs of chord locations (i.e., $x_1$ and $x_2$; $x_3$ and $x_4$) can provide a composite ratio of the path velocity to the pipe flow rate for each pair of ultrasonic paths (($V_{p1} + V_{p2})/V_m$) that is substantially constant over the range of Reynolds numbers ($R_e$). Furthermore, the entire set of four pairs of chord locations ($x_1$, $x_2$, $x_3$, and $x_4$) can also provide a composite ratio of the path velocity to the pipe flow rate for all ultrasonic paths (($V_{p1} + V_{p2} + V_{p3} + V_{p4})/V_m$) that is substantially constant over the range of Reynolds numbers ($R_e$).

In order to provide a well-developed turbulent fluid flow for the ultrasonic flow meter 10, the conduit 20 should be installed such that there are sufficiently long straight lengths of pipe with minimal disturbances before and after the ultrasonic flow meter 10. Each of the transducers are connected to the flow meter electronics 60, which can include a microprocessor for determining the path velocities and flow rate, an electronic controller to transmit and receive signals from the transducers, a display for displaying the flow rate, and an I/O port for external communications.

In order to determine the flow rate using the multi-path ultrasonic flow meter 10, measurements can be performed along each of the multiple (n) ultrasonic paths to determine the path velocities ($V_{p1}, V_{p2}, V_{p3}, V_{p4}, V_{pn}$). Weights ($w_i$) can be assigned each-path velocities ($V_{pi}$) to determine a composite velocity ($V_c$) by calculating a weighted average:

$$Vc = \sum_{i=1}^{n} w_i V_{pi} \quad (9)$$

In the embodiment using the four exemplary chord locations (i.e., $x_1=0.70$, $x_2=0.34$ $x_3=-0.34$, $x_4=-0.70$), equal weights can be used ($w_1=w_2=w_3=w_4=(1/n)=\frac{1}{4}=0.25$) in determining the composite velocity ($V_c$):

$$Vc = \sum_{i=1}^{4} (0.25) V_{pi} \quad (10)$$

As evidenced by the equations above, by using the exemplary chord locations, this composite velocity ($V_c$) can be determined without any knowledge of the Reynolds number ($R_e$) or several of the other factors affecting a flow profile (e.g., other fluid characteristics, pipe roughness, pipe configuration (e.g., straight, bends, elbows, tees, valves, headers, etc.), and disturbances caused by the ultrasonic flow meter transducers). Despite not taking into account the flow profile, this composite velocity ($V_c$) has proven to be highly accurate, with errors between the measured composite velocity ($V_c$) and the known and actual reference flow rate ($V_r$) used for calibration, generally less than one percent for a wide range of Reynolds numbers ($R_e$) as confirmed in laboratory testing. In order to obtain a more accurate flow rate ($V_m$) beyond the accuracy provided by use of only the composite velocity ($V_c$), however, a simply and empirically determined profile correction factor (K) can be used to account for the effect of the unknown flow profile.

In one embodiment for calibrating the multi-path ultrasonic flow meter 10, an average measured composite velocity ($V_{c(avg)}$) and average actual reference flow rate ($V_{r(avg)}$) is determined for a reference flow rate (e.g., $V_r=1,000$ gallons/min.) over a specified period of time (e.g., 1 minute). The profile correction factor (K) for this reference flow rate (V) can be determined by:

$$K = \frac{V_{r(avg)}}{V_{c(avg)}} \quad (11)$$

This profile correction factor (K) provides the actual error percentage of the composite velocity ($V_c$) at the reference flow rate ($V_r$). In addition, in one embodiment for calibrating the multi-path ultrasonic flow meter 10, a chord velocity ratio ($R_{cv}$) can also be determined. In the embodiment using the four exemplary chord locations ($x_1=0.70$, $x_2=0.34$ $x_3=-0.34$, $x_4=-0.70$), the chord velocity ratio ($R_{cv}$) can be determined by:

$$R_{cv} = \frac{V_{p1} + V_{p4}}{V_{p2} + V_{p3}} \quad (12)$$

This process can be repeated during calibration for several different reference flow rates ($V_r$), each time associating a profile correction factor (K) with a composite velocity ($V_c$) and chord velocity ratio ($R_{cr}$). Once a sufficient number of reference flow rates ($V_r$) have been used during calibration, each providing a profile calibration factor (K) associated with a composite velocity ($V_c$) and a chord velocity ratio ($R_{cr}$), the profile correction factor (K) can be represented as a function of the composite velocity ($V_c$) and the chord velocity ratio ($R_{cv}$) (e.g., K can be looked up in a table when $V_c$ and $R_{cv}$ are known).

$$K = f(V_c, R_{cv}) \quad (13)$$

In order to minimize the required number of reference flow rates ($V_r$) in calibration, interpolation can be used to provide the profile correction factors (K) for combinations of composite velocities ($V_c$) and chord velocity ratios ($R_{cv}$) not encountered during calibration. When this interpolation is complete, this profile correction factor (K) table or function can be stored in the memory of the flow meter electronics 60. Once calibrated, when the multi-path ultrasonic flow meter 10 measures a composite velocity ($V_c$) and a chord velocity ratio ($R_{cv}$), the profile correction factor (K) can be determined based on the stored stable or function and applied to the composite velocity ($V_c$) to provide a more accurate flow rate ($V_m$) to be displayed:

$$V_m = K(V_c) \quad (14)$$

As evidenced by the equations above, this simplified calibration can be performed and the flow rate ($V_m$) can be determined without any knowledge of the Reynolds number ($R_e$) or several of the other factors affecting a flow profile (e.g., other fluid characteristics, pipe roughness, pipe configuration (e.g., straight, bends, elbows, tees, valves, headers, etc.), and disturbances caused by the ultrasonic flow meter transducers). Despite not taking into account the flow profile, this flow rate ($V_m$) has proven to be highly accurate, with errors between the calibration corrected flow rate ($V_m$) and the known and actual reference flow rate ($V_r$) used for calibration, generally less than 0.15 percent over the range of Reynolds numbers ($R_e$) as confirmed in laboratory testing. Furthermore, as discussed above and shown in FIG. 5, even if the relative pipe wall roughness ($\epsilon$/D) for a particular pipe were to significantly change (i.e., from $10^{-3}$ to $10^{-8}$) after calibration of an ultrasonic flow meter 10 using the exemplary chord locations, that change would not necessarily require additional calibration since the change would have a negligible impact on the accuracy of the ultrasonic flow meter 10.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A multi-path ultrasonic flow meter for determining the flow rate of a fluid in a conduit comprising:
    said conduit having a mid-radius chord location where the ratio of the path velocity of said fluid averaged along said mid-radius chord to said flow rate is substantially constant over a range of Reynolds numbers;
    a first transducer pair attached to said conduit forming a first ultrasonic path at a first chord location at a first distance from the center of said conduit, wherein said first distance is greater than the distance of said mid-radius chord to said center;
    a second transducer pair attached to said conduit forming a second ultrasonic path at a second chord location at a second distance from said center of said conduit, wherein said second distance is less than said distance of said mid-radius chord to said center;

flow electronics for determining a first path velocity of said fluid averaged along said first ultrasonic path and a second path velocity of said fluid averaged along said second ultrasonic path, wherein the composite ratio of said first path velocity and said second path velocity to said flow rate is substantially constant over said range of Reynolds numbers.

2. The multi-path ultrasonic flow meter of claim 1, further comprising:
a third transducer pair attached to said conduit forming a third ultrasonic path at a third chord location at a third distance from said center of said conduit, wherein said third distance is greater than said distance of said mid-radius chord to said center;
said flow electronics for determining a third path velocity of said fluid averaged along said third ultrasonic path, wherein the composite ratio of said first path velocity, said second path velocity, and said third path velocity to said flow rate is substantially constant over said range of Reynolds numbers.

3. The multi-path ultrasonic flow meter of claim 1, further comprising:
a third transducer pair attached to said conduit forming a third ultrasonic path at a third chord location at a third distance from said center of said conduit, wherein said third distance is less than said distance of said mid-radius chord to said center;
said flow electronics for determining a third path velocity of said fluid averaged along said third ultrasonic path, wherein the composite ratio of said first path velocity, said second path velocity, and said third path velocity to said flow rate is substantially constant over said range of Reynolds numbers.

4. The multi-path ultrasonic flow meter of claim 1, wherein said range of Reynolds numbers is from 2,000 to 2,000,000.

5. The multi-path ultrasonic flow meter of claim 1, wherein said range of Reynolds numbers is from 2,000 to 500,000.

6. A method of determining the chord locations for a multi-path ultrasonic flow meter for determining the flow rate of a fluid in a conduit comprising the steps of:
determining a mid-radius chord location in said conduit where the ratio of the path velocity of said fluid averaged along said mid-radius chord to said flow rate is substantially constant over a range of Reynolds numbers;
determining a first chord location of a first transducer pair attached to said conduit forming a first ultrasonic path at a first distance from the center of said conduit, wherein said first distance is greater than the distance of said mid-radius chord to said center;
determining a second chord location of a second transducer pair attached to said conduit forming a second ultrasonic path at a second distance from said center of said conduit, wherein said second distance is less than said distance of said mid-radius chord to said center;
determining a first path velocity of said fluid averaged along said first ultrasonic path and a second path velocity of said fluid averaged along said second ultrasonic path, wherein said first chord location and said second chord location are selected such that the composite ratio of said first path velocity and said second path velocity to said flow rate is substantially constant over said range of Reynolds numbers.

7. The method of claim 6, further comprising the steps of:
determining a third chord location of a third transducer pair attached to said conduit forming a third ultrasonic path at a third distance from said center of said conduit, wherein said third distance is greater than said distance of said mid-radius chord to said center;
determining a third path velocity of said fluid averaged along said third ultrasonic path, wherein said third chord location is selected such that the composite ratio of said first path velocity, said second path velocity, and said third path velocity to said flow rate is substantially constant over said range of Reynolds numbers.

8. The method of claim 6, further comprising the steps of:
determining a third chord location of a third transducer pair attached to said conduit forming a third ultrasonic path at a third distance from said center of said conduit, wherein said third distance is less than said distance of said mid-radius chord to said center;
determining a third path velocity of said fluid averaged along said third ultrasonic path, wherein said third chord location is selected such that the composite ratio of said first path velocity, said second path velocity, and said third path velocity to said flow rate is substantially constant over said range of Reynolds numbers.

9. The method of claim 6, wherein said range of Reynolds numbers is from 2,000 to 2,000,000.

10. The method of claim 6, wherein said range of Reynolds numbers is from 2,000 to 500,000.

11. A method of determining the flow rate of a fluid in a conduit comprising the steps of:
determining the path velocities of said fluid averaged along a plurality of ultrasonic paths formed by a plurality of transducer pairs at a plurality of chord locations;
determining a composite velocity by determining a weighted average of said path velocities;
determining a chord velocity ratio based on said path velocities;
determining a profile correction factor based on said composite velocity and said chord velocity ratio; and
determining said flow rate based on said composite velocity and said profile correction factor.

12. The method of claim 11, wherein said step of determining said composite velocity uses equal weights for said path velocities.

13. The method of claim 11, wherein said step of determining a profile correction factor based on said composite velocity and said chord velocity ratio comprises the step of retrieving said profile correction factor in a table.

14. The method of claim 11, wherein said step of determining said flow rate based on said composite velocity and said profile correction factor, includes multiplying said composite velocity by said profile correction factor.

* * * * *

UNITED STATES PATENT AND TRADEMARK OFFICE
CERTIFICATE OF CORRECTION

PATENT NO. : 7,942,068 B2
APPLICATION NO. : 12/402325
DATED : May 17, 2011
INVENTOR(S) : Ao et al.

Page 1 of 1

It is certified that error appears in the above-identified patent and that said Letters Patent is hereby corrected as shown below:

In Column 6, Line 33, delete "$x_i=0.70$," and insert -- $x_1=0.70$, --, therefor.

In Column 7, Line 67, delete "$(R_{cr})$," and insert -- $(R_{cv})$, --, therefor.

Signed and Sealed this
Fourth Day of October, 2011

David J. Kappos
*Director of the United States Patent and Trademark Office*